United States Patent [19]

Andrews et al.

[11] Patent Number: 4,962,995
[45] Date of Patent: Oct. 16, 1990

[54] GLASSES FOR HIGH EFFICIENCY ERBIUM (3+) OPTICAL FIBER LASERS, AMPLIFIERS, AND SUPERLUMINESCENT SOURCES

[75] Inventors: Leonard J. Andrews, Wayland; William J. Miniscalco, Sudbury, both of Mass.

[73] Assignee: GTE Laboratories Incorporated, Waltham, Mass.

[21] Appl. No.: 367,393

[22] Filed: Jun. 16, 1989

[51] Int. Cl.$^5$ .................... G02B 1/00; C03C 13/04
[52] U.S. Cl. ...................... 350/96.34; 350/96.29; 372/6; 372/40; 501/37; 501/40; 501/900
[58] Field of Search ........... 350/96.10, 96.29, 96.30, 350/96.31, 96.33, 96.34; 372/6, 40; 501/30, 37, 40, 151, 900

[56] References Cited

U.S. PATENT DOCUMENTS

| | | | |
|---|---|---|---|
| 4,044,315 | 8/1977 | Snitzer | 372/40 |
| 4,637,025 | 1/1987 | Snitzer et al. | 372/1 |
| 4,717,691 | 1/1988 | Lucas et al. | 501/40 |
| 4,788,687 | 11/1988 | Miniscalco et al. | 372/40 |

OTHER PUBLICATIONS

L. J. Andrews, W. Miniscalco, and T. Wei, Excited State Absorption in Fiber Amplifiers, Proc. Int. School on Excited States of Trans. Metals, Wroclaw, Poland, Jun. 20, 1988.

W. J. Miniscalco, L. J. Andrews, B. A. Thompson, T. Wei and B. T. Hall $^4I_{13/2}$–$^4I_{15/2}$ Emission and Absorption Cross Sections for $Er^3$ + Doped Glasses, OSA Proc. of the 1989 Tunable Solid State Lasers Conference, May 1989.

J. R. Armitage, G. G. Atkins, R. Wyath, B. J. Ainslie, S. P. Craig, Spectroscopic Studies of $Er^{3+}$ Doped Single Mode Silica Fibre, Topical Meeting on Tunable Solid State Lasers, OFC/IOOC '87, Technical Digest Series, vol. 20, p. 193'ff.

T. J. Whitley, T. G. Hodgkinson, 1.54 μm $Er^{3+}$–Doped Fiber Amplifier Optically Pumped at 807 μm, ECOC, 1988.

Primary Examiner—John D. Lee
Attorney, Agent, or Firm—James J. Cannon, Jr.; Victor F. Lohmann, III

[57] ABSTRACT

Glass compositions for high efficiency erbium$^{3+}$-doped optical fiber lasers, amplifiers and superluminescent sources are optimized for pumping by high power solid state lasers in the vicinity of 800 nm to provide amplified signals in wavelengths between 1.5 and 1.7 microns, a principal telecommunications window. A number of suitable host glasses for doping with erbium 3+ are identified wherein the excited state absorption/ground state absorption intensity ratio calculated at 800 nm is 1.00 or less.

45 Claims, 1 Drawing Sheet

GLASSES FOR HIGH EFFICIENCY ERBIUM (3+) OPTICAL FIBER LASERS, AMPLIFIERS, AND SUPERLUMINESCENT SOURCES

BACKGROUND OF THE INVENTION

This invention pertains generally to the field of fiber optics. In particular, it pertains to glass compositions which improve the performance of optical fiber lasers, amplifiers, and superluminescent sources used in telecommunications and sensor systems.

It has been a long term goal for telecommunications systems to incorporate active functions into optical fiber rather than have the fiber act only as a passive waveguiding medium. In particular, the function of direct optical amplification within the core of a fiber has many potential advantages if a practical means could be devised of transferring optical pump power to signal power. Other important applications of active fibers are as lasers and superluminescent sources. The latter device is a high power source of incoherent, broadband light; a description of it can be found in U.S. Pat. No. 4,637,025 by Snitzer et al. Rare-earth doped fiber lasers are of interest in telecommunications because they are readily adapted to produce output with a very narrow linewidth and a high percentage of their output can be coupled into the singlemode transmission fiber. Fiber lasers and superluminescent sources are potentially important in sensor technology for the latter reason also, and because they can be made to operate at a variety of important wavelengths. The same physical process, i.e. stimulated emission of photons, governs the behaviors of lasers, optical amplifiers, and superluminescent sources. The discussion of this invention focuses on the optical amplifier since the efficient production of the high single-pass gain required for such a device makes it the most sensitive to the factors limiting pump efficiency. Nevertheless, all the considerations for optical amplifiers other than signal-to-noise ratio (SNR) apply as well to lasers and superluminescent sources, and the corresponding benefits should be obvious to one skilled in the art.

Telecommunication systems make use of the low attenuation optical windows that are located at 1.3 and 1.55 microns in silica fiber. The use of the rare earth ions $Er^{3+}$ and $Nd^{3+}$, which have luminescent transitions falling within these windows, as fiber dopants is known in the art, as disclosed in "Excited State Absorption of Rare Earths in Fiber Amplifiers", L. J. Andrews et al, Conference Proceedings, International School on Excited States of Transmission Elements, Wroclaw, Poland, June 20-25, 1988, which is incorporated herein by reference as background material.

Direct amplification of 1.5 μm optical signals within an optical fiber has been successfully demonstrated in a number of laboratories using fiber which has been doped in the core with the rare earth ion $Er^{3+}$. The mechanism for light amplification in doped fibers is exactly the same as for laser action; it is a result of stimulated emission from the excited rare earth ion induced by the optical signal as it propagates through the fiber core. The energy stored in an inverted population of excited $Er^{3+}$ ions is transferred to the signal, causing the signal to experience an increase in optical power (gain). The population inversion required for this effect is brought about by an optical pump, a second light source coupled to the fiber core which is of greater intensity than the signal and which is resonant with one of the $Er^{3+}$ absorption bands. The overall efficiency with which the optical pump power is transferred to signal power depends upon the coupling between the pump light and the $Er^{3+}$ ions, and the coupling between the $Er^{3+}$ ions and the signal light. This efficiency has been found by a number of researchers to be highly dependent on which $Er^{3+}$ absorption band is pumped. This phenomenon is the principal limitation of the amplifier and results from inefficient coupling between the pump light and the $Er^{3+}$ ions. We have identified a way to increase the efficiency of this coupling for the important pump wavelengths near 800 nm and significantly improve the performance of the amplifier when pumped by AlGaAs diode lasers.

The $Er^{3+}$ optical absorption spectrum is comprised of a number of transitions, including eight which lie in the visible to near-infrared spectral region. Optical pumping any of them will cause the $Er^{3+}$ ion to luminescence at 1.5 microns, a wavelength which happens to coincide with the "third" telecommunications window in silica fiber. This fact is the origin of telecommunication interest in $Er^{3+}$ doped fiber. To date, optical amplification has been demonstrated at 1.5 microns through laser pumping most of these transitions, and Table 1 contains a summary of recently reported results.

TABLE 1

| PUMP WAVELENGTH EFFICIENCY | | | |
|---|---|---|---|
| Pump Wavelength (nm) | Pump Power (nm) | Gain (dB) | Efficiency (dB/mW) |
| 514.5 | 225 | 33 | 0.15 |
| 532 | 25 | 34 | 1.36 |
| 665 | 100 | 26 | 0.26 |
| 807 | 20 | 8 | 0.40 |
| 980 | 11 | 24 | 2.18 |
| 1490 | 36 | 14.4 | 0.40 |

Of particular interest is the efficiency value quoted in Table 1 for pumping at 807 nm, the nominal operating wavelength of AlGaAs/GaAs laser diodes. These laser diodes are by a wide margin the best developed semiconductor pump sources and any practical $Er^{3+}$ fiber amplifier will require such a high power, reliable, and inexpensive pump. However, the efficiency of 0.4 dB/mw reported for 800 nm pumping is substantially lower than the best efficiency shown in Table 1 even though this value was obtained using a fiber specially designed to enhance performance. In addition to gain, signal-to-noise ratio (SNR) is a major consideration in optical amplifiers, and here, as well, pumping at 800 nm is expected to yield poorer performance than pumping at other $Er^{3+}$ absorption bands. The performance of 800 nm pumped amplifiers must be improved in order to develop practical devices. This disclosure addresses this problem and describes a method for increasing the 800 nm pumping efficiency of $Er^{3+}$ fiber amplifiers, lasers, and superluminescent sources.

The $Er^{3+}$ 800 nm pump band has low efficiency due to a combination of strong excited state absorption (ESA) and weak ground state absorption (GSA). This has been confirmed by direct spectroscopic observation by us and earlier by others, as well as through models of fiber amplifiers. The effect is straight-forward to understand. The GSA spectrum of a transparent material containing $Er^{3+}$ ions consists of a series of bands arising from transitions from the ground state of the ion to the various excited states. In the case of the $Er^{3+}$ pump band at 800 nm, the transition is from the $^4I_{15/2}$ ground state to the $^4I_{9/2}$ exited state. Under conditions of intense optical pumping, the lowest excited state of $Er^{3+}$ ($^4I_{13/2}$) becomes appreciably populated, even to the extent of having a much higher population than the ground state. This is the population inversion required to achieve gain. Under conditions of high inversion, the absorption spectrum changes to that of the ESA spectrum and now consists of transitions from the lowest excited state to the higher excited states. It turns out coincidentally that the GSA spectrum and the ESA spectrum both have bands at 800 nm. For the silica glass fiber materials that have been examined in the literature to date, the spectrally integrated ESA band intensity exceeds the integrated GSA band intensity at 800 nm by a factor of two. This means that as the $Er^{3+}$ excited state population increases under optical pumping at 800 nm, pump photons will be preferentially absorbed by the excited state rather than the ground state. In silica glass, the higher excited states quickly decay to the lowest excited state through the liberation of heat. This nonsaturable parasitic process can lead to serious pump inefficiency because pump photons merely recycle excited states causing heat production, and are lost for doing the useful work of transferring $Er^{3+}$ population from the ground to the first excited state.

SUMMARY OF THE INVENTION

A principal object of the invention is to provide a glass composition for high efficiency optical fiber lasers, amplifiers, and superluminescent sources whose performance is substantially better than the corresponding devices made using standard telecommunications optical fiber.

A further object of the invention is to provide a glass composition for high efficiency optical fiber lasers, amplifiers, and superluminescent sources utilizing Erbium (3+)-doped glass fibers which can be pumped by solid state, high power laser diodes at 800 nm.

Still a further object of the invention is to provide alternate types of glass compositions which when doped with rare earth ions will provide high efficiency optical fiber lasers, amplifiers, and superluminescent sources when pumped at 800 nm.

In a first aspect of the invention, a glass composition for a high efficiency optical fiber amplifier is made from an $Er^{3+}$ doped non-oxide glass fiber comprising in mole percent 54% $Z_rF_4$, 20% $BaF_2$, 3.5% $LaF_3$, 3.5% $lF_3$, 15.5% $NaF$, 2.5% $I_nF_3$ and 1.0% $E_rF_3$, a fluorozirconate composition.

In a second aspect of the invention, a number of suitable host glasses for doping with rare earth ions are identified, such as phosphate glasses and fluorophosphate glasses, wherein the ESA/GSA intensity ratio calculated at 800 nm is 1.00 or less.

DESCRIPTION OF THE PREFERRED EMBODIMENTS

Figure 1:
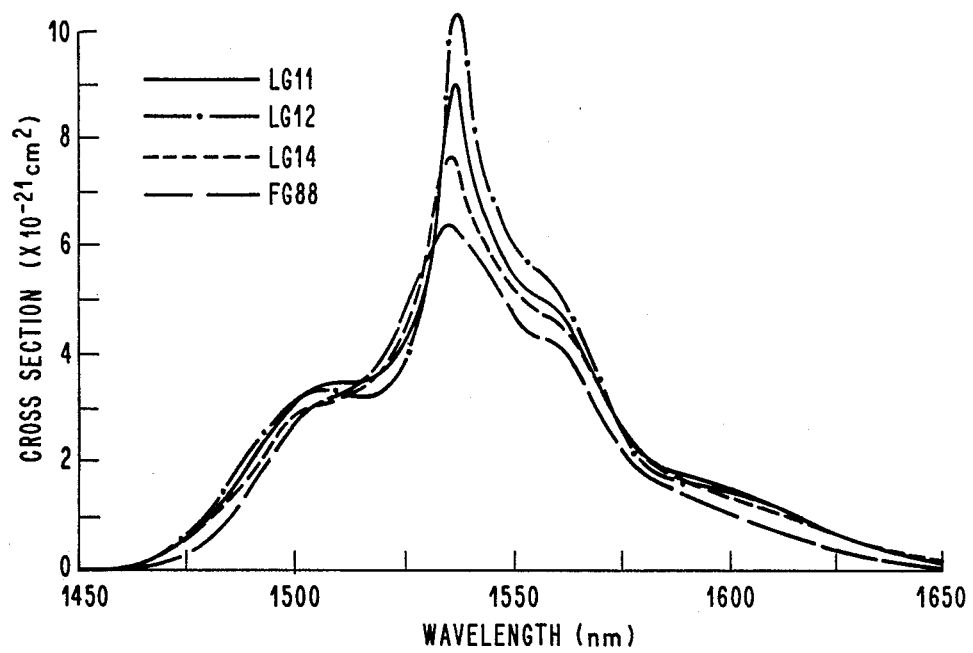
FIG. 1 is a plot comparing the stimulated emission cross sections for the $^4I_{13/2} \rightarrow ^4I_{15/2}$ transition of $Er^{3+}$-doped glasses.

This invention provides a number of glass compositions other than silica which can be used in high efficiency optical fiber lasers, amplifiers, and superluminescent devices, and it further provides a specific $Er^{3+}$-doped glass fiber that is substantially better than $Er^{3+}$-doped standard telecommunications fibers.

An approach to solving the problems discussed in the Background is to identify alternative $Er^{3+}$ host materials, specifically glasses other than the silica, which is the primary constituent of telecommunications optical fiber, that can improve the ESA/GSA intensity ratio at 800 nm and thereby improve the optical pumping efficiency of AlGaAs/GaAs diode lasers and the resultant SNR. We have made a major advance toward solving this problem using a semi-empirical approach known as Judd-Ofelt theory to identify glasses that perturb the relative ESA and GSA transitions strengths in a favorable manner, as reported in the paper incorporated by reference in the Background and in the paper "$^4I_{13/2} \leftrightarrow ^4I_{15/2}$ Emission & Absorption Cross Sections for $Er^{3+}$-Doped Glasses", Proceedings of the 1989 Tunable Solid State Lasers Topical Meeting, Falmouth, Mass., May, 1989, which is also incorporated herein by reference. Table 2 shows the results of this analysis for $Er^{3+}$ glass data which was available in the literature as well as the results from data acquired by the inventors at GTE Laboratories Incorporated (GTEL) as reported below. It shows that we can expect the integrated ESA/GSA ratio to improve by a factor of two by choosing an appropriate glass. In addition, the oscillator strength of the $^4I_{15/2} \rightarrow ^4I_{9/2}$ GSA transition, which provides useful pumping near 800 nm, increases by more than a factor of two for certain glasses.

TABLE 2

| $Er^{3+}$ Calculated ESA/GSA at 0.8 Near 800 nm | | | |
|---|---|---|---|
| | GSA Oscillator Strength ($\times 1.0^{-7}$) | ESA/GSA Ratio | Source |
| Ca K BeF2 | 2.0 | 0.88 | 1 |
| BZLT | 1.8 | 0.88 | GTEL |
| ZBLAN | 1.8 | 0.98 | GTEL |
| Fluorophosphate (LG11) | 2.4 | 0.99 | GTEL |
| Fluorophosphate (LG14) | 2.3 | 1.00 | GTEL |
| Pb Germanate | 2.6 | 1.11 | 1 |
| Li Mg Phosphate | 2.0 | 1.19 | 1 |
| Na Borophosphate | 1.9 | 1.22 | 1 |
| K Borosilicate | 1.1 | 1.75 | 1 |

[1] Auzel, Ann. Telecommunications 24,199(1969).

We have investigated a series of $Er^{3+}$ doped glasses for fiber laser and amplifier applications since glass compositions are required that are more amenable to diode laser pumping at 800 nm, as reported in the papers cited supra. Since the gain and signal/noise ratio of three-level devices are quite sensitive to the relevant cross sections, we have undertaken an investigation of how the latter depend upon glass composition. We report here measurements of the stimulated emission and absorption cross sections for the $^4I_{13/2} \leftrightarrow ^4I_{15/2}$ transition at 1.5 μm in several promising $Er^{3+}$-doped glasses. In addition to the 800 nm ESA/GSA ratio, these cross sections are also important in determining the overall performance of $Er^{3+}$ lasers, amplifiers, and superluminescent sources.

The choice of glass compositions for this investigation was motivated by the above mentioned Judd-Ofelt analysis which indicated that ESA is strongest for the silicates and weakest for the fluorides, as indicated in Table 2. Phosphate, flourophosphate, and heavy metal fluoride glasses were examined, with a standard Ge-doped silica glass included as a reference. The compositions of representative bulk glasses are listed in Table 3: phosphate (LG12), low fluorine fluorophosphate (LG11), high-fluorine fluorophosphate (LG14), and fluorozirconate (FG88). The synthesis and measurement procedures used are discussed in the above cited work.

TABLE 3

| BULK GLASS COMPOSITIONS | | | | |
|---|---|---|---|---|
| | SAMPLE CONTENT (mole %) | | | |
| | LG11 | LG12 | LG14 | FG88 |
| $Er_2O_3$ | 0.5 | 0.5 | — | — |
| $ErF_3$ | — | — | 1.0 | 1.0 |
| $P_2O_5$ | — | 45. | — | — |
| $Al(PO_3)_3$ | 16. | — | — | — |
| $Al_2O_3$ | — | 4.3 | — | — |
| $AlF_3$ | — | — | 25.5 | 3.5 |
| $ZrF_4$ | — | — | — | 54. |
| $Li_2O$ | 10. | 25. | — | — |
| LiF | 41.5 | — | — | — |
| $Na_2O$ | — | 25. | — | — |
| $NaPO_3$ | — | — | 13. | — |
| NaF | — | — | — | 15.5 |
| $MgF_2$ | — | — | 20. | — |
| $CaF_2$ | — | — | 20. | — |
| $BaF_2$ | 32. | — | 20. | 20. |
| $LaF_3$ | — | — | 1.0 | 3.5 |
| $InF_3$ | — | — | — | 2.5 |

Table 4 lists oscillator strengths calculated for the glasses in Table 3 assuming the transition is completely electric dipole. Since the transition is actually 30–50% magnetic dipole, these values are systematically low by 3–5%, a discrepancy that has no effect on the cross sections or our conclusions. FIG. 1 illustrates the stimulated emission cross section spectra obtained in this way and the peak cross sections for both emission and absorption are listed in Table 4.

TABLE 4

| | $^4I_{13/2} \longleftrightarrow$ TRANSITION FOR $Er^{3+}$-DOPED GLASSES | | | |
|---|---|---|---|---|
| | EMISSION | | ABSORPTION | |
| SAMPLE | Oscillator Strength $(\times 10^{-7})$ | Peak $(\times 10^{-21} cm^2)$ | Oscillator Strength $(\times 10^{-7})$ | Peak $(\times 10^{-21} cm^2)$ |
| Ge-doped silica P880324 | 11.3 | 8.7 | 9.9 | 7.3 |
| Phosphate LG12 | 17.7 | 10.2 | 15.5 | 7.8 |
| Fluorophosphate LG11 | 16.9 | 8.9 | 14.8 | 6.7 |
| Fluorophosphate LG14 | 16.9 | 7.6 | 14.8 | 5.8 |
| Fluorozirconate FG88 | 14.8 | 6.3 | 12.9 | 5.0 |

Table 4 reveals that phosphate and fluorophosphate glasses have the largest oscillator strengths while silica has the lowest, although overall variations are less than 60%. The values fall within the range reported by Sandoe et al. who found the highest oscillator strengths for sodium borate glasses. As seen in FIG. 1, however, variations in bandwidth have a more significant effect upon the peak stimulated emission cross section. In the phosphate-fluorophosphate-fluorozirconate series, the increase in bandwidth with increasing fluorine content reduces the peak cross section much faster than the decrease in oscillator strength. For the Ge-doped silica fiber, however, the very narrow emission band produces a moderately high peak cross section despite the low oscillator strength.

The full-widths at half-maximum (FWHM) and peak wavelengths are listed in Table 5 for both emission and absorption. From these results, as well as measurements on glasses not included in Table 5, a definite trend in emission and absorption bandwidths emerges. The widths increase in the order silicates, phosphates, fluorophosphates, and fluorides, with the high-fluorine-content fluorophosphate (LG14) having a broader emission spectrum than the low-fluorine-content glass (LG11).

TABLE 5

| | $^4I_{13/2} \longleftrightarrow {}^4I_{15/2}$ BANDWIDTHS | | | |
|---|---|---|---|---|
| | EMISSION | | ABSORPTION | |
| SAMPLE | Peak (nm) | FWHM (nm) | Peak (nm) | FWHM (nm) |
| Ge-doped silica P880324 | 1537.3 | 23.5 | 1532.6 | 15.5 |
| Phosphate LG12 | 1537.9 | 31.3 | 1532.6 | 59.2 |
| Fluorophosphate LG11 | 1537.3 | 36.3 | 1532.6 | 62.2 |
| Fluorophosphate LG14 | 1536.5 | 46.8 | 1531.4 | 68.2 |
| Fluorozirconate FG88 | 1535.7 | 62.0 | 1530.4 | 66.5 |

Measurements of absorption and emission spectra and cross sections reveal that $Er^{3+}$-doped phosphate and fluorophosphate glasses have advantages over the high-silica glass used for standard telecommunications fiber. Oscillator strengths, bandwidths, and, in some cases, peak cross sections are larger. The wider bandwidth offers the prospects of greater tuning ranges for lasers and wider gain bandwidths for amplifiers. The variations in bandwidth with fluorine content observed for the fluorophosphates enables one to trade-off peak gain and bandwidth to optimize performance. The most important criterion for many applications is amenability to efficient diode laser pumping at 800 nm. Judd-Ofelt analysis predicts that in this respect some of these glasses will be better than silica by as much as a factor of two.

Table 6 illustrates efficiencies for an $Er^{3+}$ fiber amplifier pumped at 800 nm calculated using a model and a set of parameters which reproduce the empirical results in Table 1.

TABLE 6

| EFFICIENCY OF 800-nm-PUMPED $Er^{3+}$ FIBER AMPLIFIER | | |
|---|---|---|
| ESA/GSA Ratio at 800 nm | Gain (dB) | Efficiency (dB/mW) |
| 2.5 | 8.4 | 0.42 |
| 2.0 | 10.0 | 0.50 |
| 1.5 | 12.4 | 0.62 |
| 1.0 | 16.7 | 0.84 |
| 0.5 | 23.8 | 1.19 |
| 0. | 28.0 | 1.40 |

For these conditions a factor of two reduction in the ESA/GSA ratio is seen to improve the efficiency by 50–60% and increase the gain by 6–8 dB. Moreover, Table 2 lists glasses that also have significantly greater GSA strength than silica, a situation which yields still further performance improvements. We believe these major improvements in the predicted performance of $Er^{3+}$ fiber amplifiers are sufficient to make a marginal device practical.

Using Judd-Ofelt theory as a predicative guide, two glass types, namely fluorides and fluorophosphates, appear to be especially promising glasses for use as fiber lasers, amplifiers, and superluminescent sources, although phosphates and germanates are also predicted to have significantly improved ESA/GSA ratios relative to silicates. In addition many other related glass compositions will be similarly favorable. A spectroscopic measurement of the ESA in the vicinity of 800 nm was performed on a fluorozirconate optical fiber, and the results confirmed the Judd-Ofelt analysis, showing that the ESA/GSA ratio was indeed close to unity at 0.8 micron for $Er^{3+}$ in ZBLAN glass.

The essence of the invention is we have discovered and demonstrated that one glass, fluorozirconate or ZBLAN glass, is substantially better than standard telecommunications optical fiber glass with respect to the ESA/GSA ratio at 800 nm. This translates into a significant performance improvement for $Er^{3+}$ optical amplifiers pumped by AlGaAs/GaAs diode lasers. In addition, we have demonstrated the existence of an accurate predictive theoretical tool which indicates several other glass types will also function well in this regard. The advantages also apply to optical fiber lasers and superluminescent sources in a wide variety of applications.

What is claimed is:

1. A glass composition for an optical fiber amplifier system, said optical fiber having an active medium comprising a fluoride glass containing one of $ErF_3$ and $Er_2O_3$, said optical fiber amplifier system amplifying at a wavelength as a result of a transition from the electronic state $^4I_{13/2}$ of $Er^{3+}$ to the $^4I_{15/2}$ electronic state of $Er^{3+}$.

2. A glass composition for an optical fiber amplifier in accordance with claim 1 wherein said wavelength is between 1.5 and 1.7 micrometers when the $Er^{3+}$ $^4I_{15/2} \rightarrow {}^4I_{9/2}$ transition is pumped by a laser in the vicinity of 800 nm.

3. A glass composition for an optical fiber amplifier in accordance with claim 1 wherein said fluoride glass comprises a cation of a metal selected from the group consisting of zirconium, hafnium, zinc, beryllium, barium, aluminum, cadmium, and combinations thereof.

4. A glass composition for an optical fiber amplifier, said optical fiber having an active medium comprising a glass having a composition consisting essentially of a fluorozirconate glass containing $ErF_3$; said optical fiber amplifier amplifying at a wavelength as a result of a transition from the electronic state $^4I_{13/2}$ of $Er^{3+}$ to the electronic state $^4I_{15/2}$ of $Er^{3+}$.

5. A glass composition for an optical fiber amplifier in accordance with claim 4 wherein said composition of said glass consists essentially of 54 mole % $ZrF_4$, 15.5 mole % NaF, 2.5 mole % $InF_3$, 3.5 mole % $AlF_3$, 3.5 mole % $LaF_3$, and 1.0 mole % $ErF_3$; said optical fiber amplifier having an emission between 1.50 and 1.7 micrometers.

6. A glass composition for an optical fiber amplifier in accordance with claim 4 wherein said fluorozirconate glass comprises a cation of a metal selected from the group consisting of zirconium, hafnium, zinc, beryllium, barium, aluminum, cadmium, and combinations thereof.

7. A glass composition for an optical fiber amplifier in accordance with claim 4 wherein said wavelength is between 1.5 and 1.7 micrometers when the $Er^{3+}$ $^4I_{15/2} \rightarrow {}^4I_{9/2}$ transition is pumped by a laser in the vicinity of 800 nm.

8. A glass composition for an optical fiber amplifier system, said optical fiber having an active medium comprising a glass having a composition consisting essentially of a fluorophosphate glass containing phosphorus, oxygen, fluorine, and one of $ErF_3$ and $Er_2O_3$; said optical fiber amplifier system amplifying as a result of a transition from the electronic state $^4I_{13/2}$ of $Er^{3+}$ to the electronic state $^4I_{15/2}$ of $Er^{3+}$.

9. A glass composition for an optical fiber amplifier in accordance with claim 8 wherein said fluorophosphate glass comprises a cation of a metal selected from the group consisting of Mg, Ca, Sr, Ba, Li, Na, K, Ln, Pb, and combinations thereof.

10. A glass composition for an optical fiber amplifier in accordance with claim 8 wherein said composition of said glass consists essentially of 41.5 mole % LiF, 32 mole % $BaF_2$, 16 mole % $Al(PO_3)_3$, 10 mole % $LiO_2$, and 0.5 mole % of one of $ErF_3$ and $ErO_3$; said optical fiber amplifier being adapted to amplify at a wavelength between 1.5 and 1.7 micrometers when the $Er^{3+}$ $^4I_{15/2} \rightarrow {}^4I_{9/2}$ transition is pumped by a laser in the vicinity of 800 nm.

11. A glass composition for an optical fiber amplifier in accordance with claim 8 wherein said composition of said glass consists essentially of 25 mole % $AlF_3$, 13 mole % $NaPO_3$, 20 mole % $MgF_2$, 20 mole % $CaF_2$, 20 mole % $BaF_2$, 1 mole % $LaF_3$ and 1 mole % of one of $Er_2O_3$ and $ErF_3$; said optical fiber amplifier being adapted to amplify at a wavelength between 1.5 and 1.7 micrometers when the $Er^{3+}$ $^4I_{15/2} \rightarrow {}^4I_{9/2}$ transition is pumped by a laser in the vicinity of 800 nm.

12. A glass composition for an optical fiber amplifier system, said optical fiber having an active medium comprising a glass having a composition consisting essentially of a phosphate glass containing phosphorous, oxygen and $Er_2O_3$, said optical fiber amplifier system amplifying at a wavelength as a result of a transition from the electronic state $^4I_{13/2}$ of $Er^{3+}$ to the electronic state $^4I_{15/2}$ of $Er^{3+}$.

13. A glass composition for an optical fiber amplifier in accordance with claim 12 wherein said phosphate glass comprises a cation of a metal selected from the group consisting of Mg, Ca, Sr, Ba, Li, Na, K, Ln, Pb, and combinations thereof.

14. A glass composition for an optical fiber amplifier in accordance with claim 12 wherein said wavelength is between 1.5 and 1.7 micrometers when the $Er^{3+}$ $^4I_{15/2} \rightarrow {}^4I_{9/2}$ transition is pumped by a laser in the vicinity of 800 nm.

15. A glass composition for an optical fiber amplifier in accordance with claim 12 wherein the composition of said glass consists essentially of 45 mole % $P_2O_5$, 4.3 mole % $Al_2O_5$, 25 mole % $Li_2O$, 25 mole % $Na_2O$, and 0.5 mole % $Er_2O_3$.

16. A glass composition for an optical fiber laser system, said optical fiber having an active medium comprising a fluoride glass containing one of $ErF_3$ and $Er_2O_3$, said optical fiber laser system lasing at a wavelength as a result of a transition from the electronic state $^4I_{13/2}$ of $Er^{3+}$ to the $^4I_{15/2}$ electronic state of $Er^{3+}$.

17. A glass composition for an optical fiber laser in accordance with claim 16 wherein said wavelength is between 1.5 and 1.7 micrometers when the $Er^{3+}$ $^4I_{15/2} \rightarrow {}^4I_{9/2}$ transition is pumped by a laser in the vicinity of 800 nm.

18. A glass composition for an optical fiber laser in accordance with claim 16 wherein said fluoride glass comprises a cation of a metal selected from the group consisting of zirconium, hafnium, zinc, beryllium, barium, aluminum, cadmium, and combinations thereof.

19. A glass composition for an optical fiber laser, said optical fiber having an active medium comprising a glass having a composition consisting essentially of a fluorozirconate glass containing $ErF_3$; said fiber laser lasing at a wavelength as a result of a transition from the electronic state $^4I_{13/2}$ of $Er^{3+}$ to the electronic state $^4I_{15/2}$ of $Er^{3+}$.

20. A glass composition for an optical fiber laser in accordance with claim 19 wherein said composition of said glass consists essentially of 54 mole % $ZrF_4$, 15.5 mole % NaF, 2.5 mole % $InF_3$, 3.5 mole % $AlF_3$, 3.5 mole % $LaF_3$, and 1.0 mole % $ErF_3$; said optical fiber laser having an emission between 1.50 and 1.7 micrometers.

21. A glass composition for an optical fiber laser in accordance with claim 19 wherein said fluorozirconate glass comprises a cation of a metal selected from the group consisting of zirconium, hafnium, zinc, beryllium, barium, aluminum, cadmium, and combinations thereof.

22. A glass composition for an optical fiber laser in accordance with claim 19 wherein said wavelength is between 1.5 and 1.7 micrometers when the $Er^{3+}$ $^4I_{15/2} \rightarrow ^4I_{9/2}$ transition is pumped by a laser in the vicinity of 800 nm.

23. A glass composition for an optical fiber laser system, said optical fiber having an active medium comprising a glass having a composition consisting essentially of a fluorophosphate glass containing phosphorus, oxygen, fluorine, and one of $ErF_3$ and $Er_2O_3$; said optical fiber laser system lasing as a result of a transition from the electronic state $^4I_{13/2}$ of $Er^{3+}$ to the electronic state $^4I_{15/2}$ of $Er^{3+}$.

24. A glass composition for an optical fiber laser in accordance with claim 23 wherein said fluorophosphate glass comprises a cation of a metal selected from the group consisting of Mg, Ca, Sr, Ba, Li, Na, K, Ln, Pb, and combinations thereof.

25. A glass composition for an optical fiber laser in accordance with claim 23 wherein said composition of said glass consists essentially of 41.5 mole % LiF, 32 mole % $BaF_2$, 16 mole % $Al(PO_2)_3$, 10 mole % $LiO_2$, and 0.5 mole % of one of $ErF_3$ and $ErO_3$; said optical fiber laser being adapted to lase at a wavelength between 1.5 and 1.7 micrometers when the $Er^{3+}$ $^4I_{15/2} \rightarrow ^4I_{9/2}$ transition is pumped by a laser in the vicinity of 800 nm.

26. A glass composition for an optical fiber laser in accordance with claim 23 wherein said composition of said glass consists essentially of 25 mole % $AlF_3$, 13 mole % $NaPO_3$, 20 mole % $MgF_2$, 20 mole % $CaF_2$, 20 mole % $BaF_2$, 1 mole % $LaF_3$ and 1 mole % of one of $Er_2O_3$ and $ErF_3$; said optical fiber laser being adapted to lase at a wavelength between 1.5 and 1.7 micrometers when the $Er^{3+}$ $^4I_{15/2} \rightarrow ^4I_{9/2}$ transition is pumped by a laser in the vicinity of 800 nm.

27. A glass composition for an optical fiber laser system, said optical fiber having an active medium comprising a glass having a composition consisting essentially of a phosphate glass containing phosphorous, oxygen and $Er_2O_3$, said optical fiber laser system lasing at a wavelength as a result of a transition from the electronic state $^4I_{13/2}$ of $Er^{3+}$ to the electronic state $^4I_{15/2}$ of $Er^{3+}$.

28. A glass composition for an optical fiber laser in accordance with claim 27 wherein said phosphate glass comprises a cation of a metal selected from the group consisting of Mg, Ca, Sr, Ba, Li, Na, K, Ln, Pb, and combinations thereof.

29. A glass composition for an optical fiber laser in accordance with claim 27 wherein said wavelength is between 1.5 and 1.7 micrometers when the $Er^{3+}$ $^4I_{15/2} \rightarrow ^4I_{9/2}$ transition is pumped by a laser in the vicinity of 800 nm.

30. A glass composition for an optical fiber laser in accordance with claim 27 wherein the composition of said glass consists essentially of 45 mole % $P_2O_5$, 4.3 mole % $Al_2O_5$, 25 mole % $Li_2O$, 25 mole % $Na_2O$, and 0.5 mole % $Er_2O_3$.

31. A glass composition in an optical fiber superluminescent source, said optical fiber having an active medium comprising a fluoride glass containing one of $ErF_3$ and $Er_2O_3$, said optical fiber superluminescent source emitting at a wavelength as a result of a transition from the electronic state $^4I_{13/2}$ of $Er^{3+}$ to the electronic state $^4I_{15/2}$ of $Er^{3+}$.

32. A glass composition for an optical fiber superluminescent source in accordance with claim 31 wherein said wavelength is between 1.5 and 1.7 micrometers when the $Er^{3+}$ $^4I_{15/2} \rightarrow ^4I_{9/2}$ transition is pumped by a laser in the vicinity of 800 nm.

33. A glass composition for an optical fiber superluminescent source in accordance with claim 31 wherein said fluoride glass comprises a cation of a metal selected from the group consisting of zirconium, hafnium, zinc, beryllium, barium, aluminum, cadmium, and combinations thereof.

34. A glass composition for an optical fiber superluminescent source, said optical fiber having an active medium comprising a glass having a composition consisting essentially of a fluorozirconate glass containing $ErF_3$; said optical fiber superluminescent source emitting at a wavelength as a result of a transition from the electronic state $^4I_{13/2}$ of $Er^{3+}$ to the electronic state $^4I_{15/2}$ of $Er^{3+}$.

35. A glass composition for an optical fiber superluminescent source in accordance with claim 34 wherein said composition of said glass consists essentially of 54 mole % $ZrF_4$, 15.5 mole % NaF, 2.5 mole % $InF_3$, 3.5 mole % $AlF_3$, 3.5 mole % $LaF_3$, and 1.0 mole % $ErF_3$; said optical fiber superluminescent source having an emission between 1.50 and 1.7 micrometers.

36. A glass composition for an optical fiber superluminescent source in accordance with claim 34 wherein said fluorozirconate glass comprises a cation of a metal selected from the group consisting of zirconium, hafnium, zinc, beryllium, barium, aluminum, cadmium, and combinations thereof.

37. A glass composition for an optical fiber superluminescent source in accordance with claim 34 wherein said wavelength is between 1.5 and 1.7 micrometers when the $Er^{3+}$ $^4I_{15/2} \rightarrow ^4I_{9/2}$ transition is pumped by a laser in the vicinity of 800 nm.

38. A glass composition for an optical fiber superluminescent source, said optical fiber having an active medium comprising a glass having a composition consisting essentially of a fluorophosphate glass containing phosphorus, oxygen, fluorine, and one of $ErF_3$ and $Er_2O_3$; said optical fiber superluminescent source emitting as a result of a transition from the electronic state $^4I_{13/2}$ of $Er^{3+}$ to the electronic state $^4I_{15/2}$ of $Er^{3+}$.

39. A glass composition for an optical fiber superluminescent source in accordance with claim 38 wherein said fluorophosphate glass comprises a cation of a metal selected from the group consisting of Mg, Ca, Sr, Ba, Li, Na, K, Ln, Pb, and combinations thereof.

40. A glass composition for an optical fiber superluminescent source in accordance with claim 38 wherein said composition of said glass consists essentially of 41.5 mole % LiF, 32 mole % $BaF_2$, 16 mole % $Al(PO_2)_3$, 10 mole % $LiO_2$, and 0.5 mole % of one of $ErF_3$ and $ErO_3$; said optical fiber superluminescent source being adapted to emit at a wavelength between 1.5 and 1.7 micrometers when the $Er^{3+}$ $^4I_{15/2} \rightarrow ^4I_{9/2}$ transition is pumped by a laser in the vicinity of 800 nm.

41. A glass composition for an optical fiber superluminescent source in accordance with claim 38 wherein said composition of said glass consists essentially of 25 mole % $AlF_3$, 13 mole % $NaPO_3$, 20 mole % $MgF_2$, 20 mole % $CaF_2$, 20 mole % $BaF_2$, 1 mole % $LaF_3$ and 1 mole % of one of $Er_2O_3$ and $ErF_3$; said optical fiber superluminescent source being adapted to emit at a wavelength between 1.5 and 1.7 micrometers when the $Er^{3+}$ $^4I_{15/2} \rightarrow ^4I_{9/2}$ transition is pumped by a laser in the vicinity of 800 nm.

42. A glass composition for an optical fiber superluminescent source, said optical fiber having an active medium comprising a glass having a composition consisting essentially of a phosphate glass containing phosphorous, oxygen and $Er_2O_3$, said optical fiber superluminescent source emitting at a wavelength as a result of a transition from the electronic state $^4I_{13/2}$ of $Er^{3+}$ to the electronic state $^4I_{15/2}$ of $Er^{3+}$.

43. A glass composition for an optical fiber superluminescent source in accordance with claim 42 wherein said phosphate glass comprises a cation of a metal selected from the group consisting of Mg, Ca, Sr, Ba, Li, Na, K, Ln, Pb, and combinations thereof.

44. A glass composition for an optical fiber superluminescent source in accordance with claim 42 wherein said wavelength is between 1.5 and 1.7 micrometers when the $Er^{3+}$ $^4I_{15/2} \rightarrow ^4I_{9/2}$ transition is pumped by a laser in the vicinity of 800 nm.

45. A glass composition for an optical fiber superluminescent source in accordance with claim 42 wherein the composition of said glass consists essentially of 45 mole % $P_2O_5$, 4.3 mole % $Al_2O_5$, 25 mole % $Li_2O$, 25 mole % $Na_2O$, and 0.5 mole % $Er_2O_3$.

* * * * *